June 7, 1927.
W. F. JUREY
MEAT TENDERER
Filed May 2, 1925
1,631,869
2 Sheets-Sheet 1
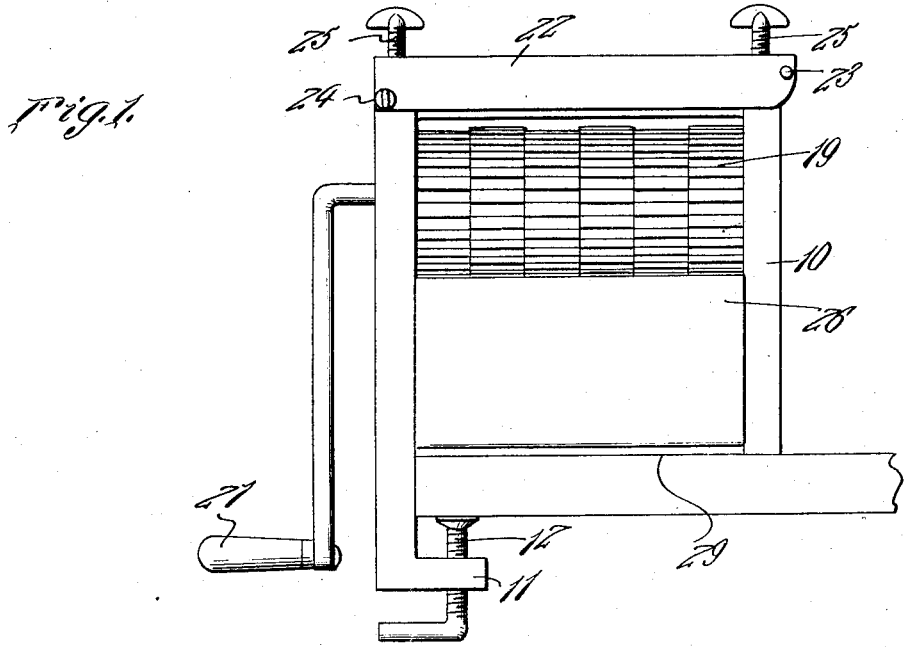
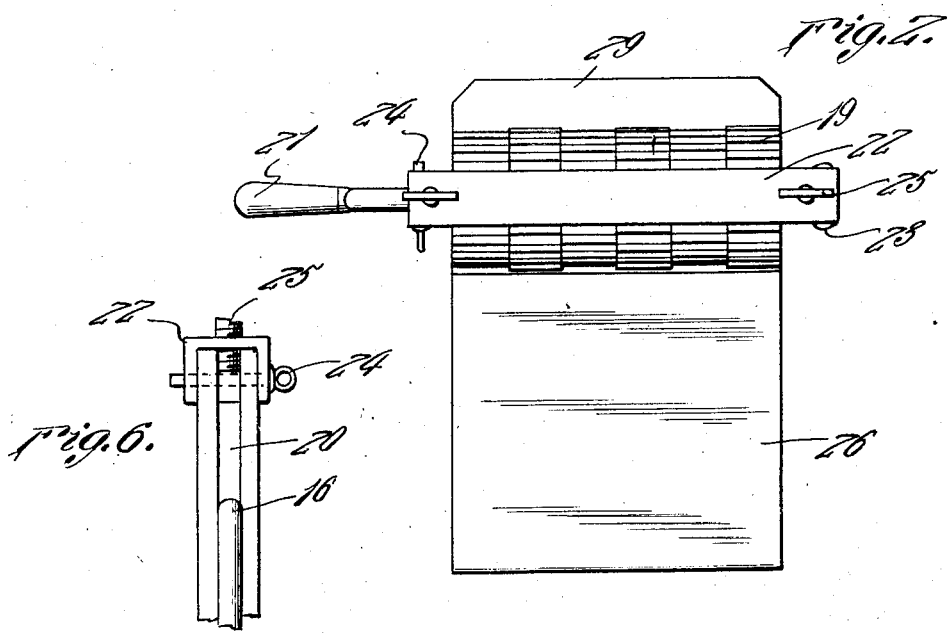

June 7, 1927.
W. F. JUREY
MEAT TENDERER
Filed May 2, 1925
1,631,869
2 Sheets-Sheet 2
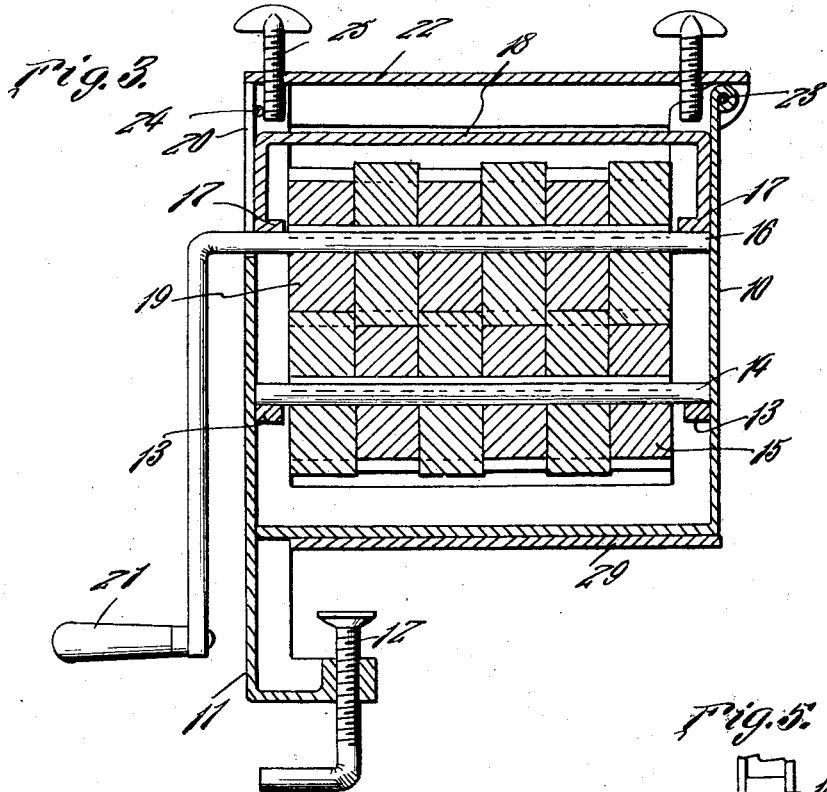
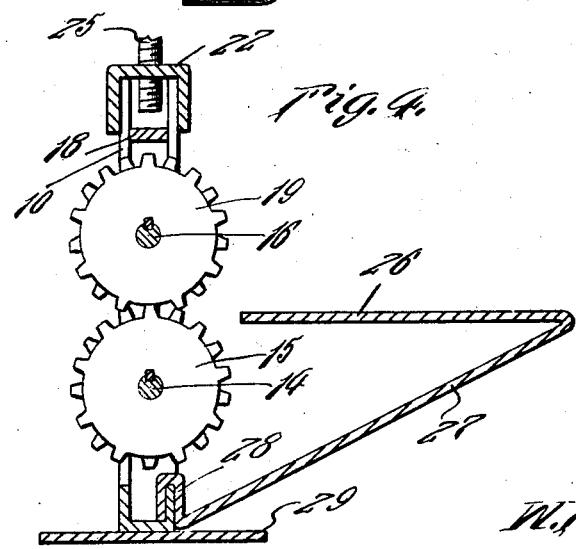
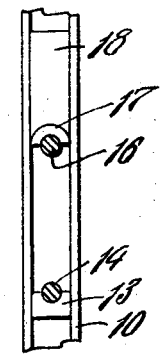
W. F. Jurey — INVENTOR
BY Victor J. Evans
ATTORNEY Patented June 7, 1927.

UNITED STATES PATENT OFFICE.

WESLEY F. JUREY, OF NORCATUR, KANSAS.

MEAT TENDERER.

Application filed May 2, 1925. Serial No. 27,601.

This invention relates to improvements in meat tenderers or masticators and contemplates the provision of a frame having transplates superimposed shafts extending therethrough and including a plurality of fixed meshing gears arranged thereon and between which portions of meat may pass in the process of tendering the same before cooking.

Another object of the invention is the provision of a hinged top for the frame and including set screws therein which have their inner ends engaging the upper portions of the upper shaft bearings in order that the gears may be regulated to various adjustments owing to the thickness of the meat to be passed therebetween.

A further object of the invention is the provision of a removable platform arranged upon the bottom and extending upwardly and outwardly therefrom and including a transversely disposed platform upon the upper end thereof and which will guide the meat and the like between the gears in the process of tendering or masticating the meat.

With the above and other objects in view, the invention further includes the following novel features and details of construction, to be hereinafter more fully described, illustrated in the accompanying drawings and pointed out in the appended claim.

In the drawings:—

Figure 1 is a side elevation of my invention.

Figure 2 is a top plan view of the same.

Figure 3 is a horizontal section thereof.

Figure 4 is a vertical sectional view.

Figure 5 is a fragmentary side elevation of one of the inner sides of the frame and bearings.

Figure 6 is a fragmentary side elevation of one side of the frame and showing the mounting of the operating handle and removable top for the frame.

Referring to the drawings in detail, wherein like characters of reference denote corresponding parts, the reference character 10 indicates a substantially rectangular frame preferably formed of channel bars and one side of which includes a lower inwardly extending substantially offset portion 11 having adjusting screw or the like as indicated at 12 and which is adapted to be threaded within this portion 11 in order that the edge of a table or the like may be inserted and held rigidly between the upper end of the adjusting screw 12 and the bottom of the frame 10 in order that the said frame will be held rigidly in place during the process of operation. Formed upon the inner and opposite sides of the frame 10 and adjacent the lower portion thereof are substantially semi-cylindrical bearings 13 which receive the opposite end portions of a driven shaft 14 which in turn has a plurality of gears 15 keyed or otherwise fixed thereon and which may be of any size and ratio of gearing upon their peripheries. The driving shaft 16 has its opposite ends journaled within correspondingly shaped oppositely disposed bearings 17 arranged above and in spaced relation to the bearings 13 and which are in turn connected with a substantially U-shaped inverted frame 18 which extends an appreciable distance thereabove and the shaft in turn includes a plurality of correspondingly shaped and geared gears 19 which are meshed with the gears 15 while the outer portion of the shaft 16 extends through a vertically extending slotted portion 20 provided in the corresponding side of the frame 10 and has its outer end substantially offset and terminating in an operating handle 21. It will be noted from the foregoing description and accompanying drawings that owing to the mountings of the shafts 14 and 16 respectively within the bearings 13 and 17 that no force or regulation as to the space between the gears 15 and 19 is provided and that meat will freely pass between these gears without exercising any stress thereupon and in order to provide such means as will hold the gears 15 and 19 in their respective spaced and regulated positions I provide a top 22 which is also preferably channel shaped and which is pivoted as at 23 to one side of the frame 10 and its opposite end normally receiving a pin 24 therethrough which in turn extends through a portion of the opposite side bar forming the frame 10 in order that the said removable cover or top 22 will be held rigidly thereto and which includes a pair of set screws or the like as indicated at 25 and which are adapted to engage the upper sides of the substantially inverted U-shaped frame 18 in order that the gears 19 carried upon the shaft 16 will be forced downwardly and against the gears 15 carried upon the shaft 14 in order that the space between these gears 15 and 19 may be regulated according to the thickness of the meat to be masticated or tendered therebetween.

In order to provide means for guiding the meat to be tendered between the gears 15 and 19 I provide a platform 26 having a downwardly and inwardly inclined portion 27 which is then bent upwardly and downwardly upon itself as at 28 and fitted to and receiving the one side of the bottom channel bar forming the frame 10 in order that the said platform 26 will be held rigidly supported upon the frame 10 and in order that meat and other substance so placed upon the platform 26 will be readily and easily guided between the tendering or masticating gears 15 and 19 respectively. The bottom rail forming the frame 10 further includes a relatively large substantially elongated plate 29 which is adapted to be secured thereto and rest upon the top of a table or the like to which the present invention is applied.

In the mode of operation of the present invention it is clearly apparent that after the substantially inverted U-shaped frame 18 is adjusted through the instrumentality of the set screws 25 and regulating the space between the gears 15 and 19 respectively that the meat or other substance to be tendered may then be placed upon the top of the platform 26 and guided between the gears 15 and 19 when the same are rotated through the instrumentality of the operating handle 21 formed upon the outer end of the driving shaft 16. When it is desirous to take the device apart and clean the same it is quite obvious that upon removing the pin 24 from the free end of the top 22 that the same may be swung upwardly and outwardly upon its pivot 23 and in so doing the substantially inverted U-shaped frame 18 will be released and readily and easily removed from the frame 10, after which the shaft 16 may be moved upwardly owing to the slotted portion 20 provided in one side thereof and after removing the same with its gears 19 the shaft 14 with its gears 15 may be removed in a similar manner.

The invention is susceptible of various changes in its form, proportions and minor details of construction, and the right is herein reserved to make such changes as properly fall within the scope of the appended claim.

Having described my invention what is claimed is:

A meat tenderer comprising an elongated channeled frame, bearing members carried thereby, a driven shaft journaled upon said bearings, a drive shaft carried by said frame and disposed in spaced superimposed relation to the aforementioned shaft, gear members arranged in staggered relation upon the shafts and adapted for intermeshing engagement, a substantially inverted U-shaped frame carried by the first mentioned frame and terminating to provide bearing portions for engagement with portions of the drive shaft, a top for the elongated frame, and adjusting means carried thereby for engagement with the inverted U-shaped frame to regulate the biting action of said gears.

In testimony whereof I affix my signature.

WESLEY F. JUREY.